(12) United States Patent
Fang et al.

(10) Patent No.: US 10,783,005 B2
(45) Date of Patent: Sep. 22, 2020

(54) COMPONENT LOGICAL THREADS QUANTITY ADJUSTMENT METHOD AND DEVICE

(71) Applicant: Alibaba Group Holding Limited, Grand Cayman (KY)

(72) Inventors: Xiaojian Fang, Hangzhou (CN); Jian Liu, Hangzhou (CN); Yi Wang, Hangzhou (CN); Chong Wu, Hangzhou (CN); Zhongyan Feng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 162 days.

(21) Appl. No.: 16/024,539

(22) Filed: Jun. 29, 2018

(65) Prior Publication Data
US 2018/0307536 A1 Oct. 25, 2018

Related U.S. Application Data

(63) Continuation of application No. PCT/CN2016/110251, filed on Dec. 16, 2016.

(30) Foreign Application Priority Data

Dec. 30, 2015 (CN) .......................... 2015 1 1021180

(51) Int. Cl.
*G06F 9/46* (2006.01)
*G06F 9/50* (2006.01)

(52) U.S. Cl.
CPC ............ *G06F 9/505* (2013.01); *G06F 9/5083* (2013.01)

(58) Field of Classification Search
CPC ............................... G06F 9/505; G06F 9/5083
See application file for complete search history.

(56) References Cited

U.S. PATENT DOCUMENTS 9,619,808 B2 * 4/2017 Bannister ............... G06Q 10/00
2004/0139434 A1 7/2004 Blythe et al.
(Continued)

FOREIGN PATENT DOCUMENTS

CN   101256515 A   9/2008
CN   102591721 A   7/2012
(Continued)

OTHER PUBLICATIONS

Translation of International Search Report from corresponding PCT Patent Application No. PCT/CN2016/110251, dated Mar. 22, 2017, 2 pages.
(Continued)

*Primary Examiner* — Camquy Truong
(74) *Attorney, Agent, or Firm* — Lee & Hayes, P.C.

(57) ABSTRACT

A method for adjusting a number of logical threads for a component including acquiring a plurality of logical threads that is callable by a component; determining a load state of each logical thread according to a utilization rate of a data processing queue corresponding to each logical thread, the load state including a normal load state and an abnormal load state; determining, according to the load states of the logical threads of the component, whether the number of logical threads of the component needs to be adjusted; and adjusting the number of logical threads of the component according to the determination result if the number of logical threads of the component needs to be adjusted. By using the method and the apparatus, the utilization rate of resources is improved while ensuring real-time calculation of data.

20 Claims, 9 Drawing Sheets

(56) References Cited

U.S. PATENT DOCUMENTS

| | | | |
|---|---|---|---|
| 2005/0125625 A1* | 6/2005 | Kilian | G06F 3/0631 |
| | | | 711/202 |
| 2006/0107261 A1* | 5/2006 | Vedula | G06F 9/5027 |
| | | | 718/100 |
| 2011/0219246 A1 | 9/2011 | Arai | |
| 2012/0254443 A1 | 10/2012 | Ueda | |
| 2014/0143789 A1 | 5/2014 | Nadathur et al. | |
| 2015/0234670 A1 | 8/2015 | Shimogawa | |
| 2015/0281113 A1 | 10/2015 | Siciliano et al. | |
| 2016/0253368 A1* | 9/2016 | Deolalikar | G06Q 10/107 |
| | | | 707/609 |

FOREIGN PATENT DOCUMENTS

| | | |
|---|---|---|
| CN | 102866922 A | 1/2013 |
| CN | 103677997 A | 3/2014 |
| WO | WO2015071008 A1 | 5/2015 |

OTHER PUBLICATIONS

Translation of Written Opinion from corresponding PCT Patent Application No. PCT/CN2016/110251, dated Mar. 22, 2017, 3 pages.
Machine translation of First Chinese Office Action for Chinese application No. 201511021180.2 dated Feb. 3, 2020, 5 pages.
Chinese Search Report dated Jan. 3, 2020 for Chinese Patent Application No. 2015110211802, 1 page.
Extended European Search Report dated Jul. 8, 2019, for European Patent Application No. 16880970.5, 9 pages.

\* cited by examiner

COMPONENT LOGICAL THREADS QUANTITY ADJUSTMENT METHOD AND DEVICE

CROSS REFERENCE TO RELATED PATENT APPLICATIONS

This application claims priority to and is a continuation of PCT Patent Application No. PCT/CN2016/110251, filed on 16 Dec. 2016, which claims priority to Chinese Patent Application No. 201511021180.2, filed on 30 Dec. 2015 and entitled "COMPONENT LOGICAL THREADS QUANTITY ADJUSTMENT METHOD AND DEVICE", which are incorporated herein by reference in their entirety.

TECHNICAL FIELD

The present disclosure relates to the field of the Internet, and, more particularly, to a method and an apparatus for adjusting the number of component logical threads.

BACKGROUND

Generally, a computer cluster may be disposed in a distributed real-time computing system. Real-time computing of data may be implemented by using the computer cluster. Typically, a master device and a plurality of slave devices may be disposed in the cluster. A real-time computing program is stored in the master device. When there is data that needs to be processed (that is, when external data is input to the distributed real-time computing system), the real-time computing program in the master device will invoke resources in the slave devices to implement data computing.

In an actual application, the real-time computing program is composed of multiple components and each component executes a specific task. The slave devices may provide multiple logical thread resources for the master device to invoke. Therefore, the master device generally pre-allocates fixed logical thread resources to each component in the real-time computing program. When there is data that needs to be processed, each component in the real-time computing program will invoke the pre-allocated logical thread resources to execute a task, thus completing computing of the data.

In the real-time computing system, the data amount of externally input data is not fixed, while the logical thread resources allocated to each component are fixed. When a large amount of external data is input, each component has many tasks to process. In this case, if a small number of logical thread resources are pre-allocated to one component, the component will have low execution efficiency, affecting real-time computing of the data. Likewise, if a small amount of external data is input while many logical thread resources are pre-allocated to one component, resources will be wasted. Therefore, a method and an apparatus for adjusting the number of component logical threads are urgently needed in the conventional techniques, to improve the utilization rate of resources while ensuring real-time computing of data.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The example embodiments of the present disclosure provide a method and an apparatus for adjusting the number of component logical threads, to improve the utilization rate of resources while ensuring real-time computing of data.

To solve the foregoing technical problem, the example embodiments of the present disclosure disclose the following technical solutions:

In an aspect, the present disclosure discloses a method for adjusting the number of component logical threads, including:

acquiring a plurality of logical threads that is callable by a component;

determining a load state of each logical thread according to a utilization rate of a data processing queue corresponding to each logical thread, the load state including a normal load state and an abnormal load state;

determining, according to the load states of the logical threads of the component, whether the number of logical threads of the component needs to be adjusted; and adjusting the number of logical threads of the component according to the determination result if the number of logical threads of the component needs to be adjusted.

Optionally, the step of adjusting the number of logical threads of the component according to the determination result includes:

adjusting the number of logical threads of the component to be: the number of current logical threads of the component*the data amount of data sent by a sending apparatus per second/the data amount of data received by the component per second, the sending apparatus being an apparatus that sends data to the component.

Optionally, the abnormal load state includes a high load state and a low load state, and the utilization rate is equal to space occupied by data stored in a message queue/pre-allocated storage space of the message queue; and the step of determining a load state of each logical thread according to a utilization rate of a data processing queue corresponding to each logical thread includes:

determining whether a utilization rate of a data processing queue corresponding to a logical thread is greater than a first preset threshold;

determining that the logical thread is in a high load state if the utilization rate is greater than the first preset threshold;

determining whether the utilization rate of the data processing queue corresponding to the current logical thread is less than a second preset threshold if the utilization rate is not greater than the first preset threshold; and determining that the logical thread is in a low load state if the utilization rate is less than the second preset threshold.

Optionally, the step of determining whether the number of logical threads of the component needs to be adjusted according to the load states of all the logical threads of the component includes:

respectively counting the number of logical threads in the high load state and the number of logical threads in the low load state among all the logical threads that are callable by the component;

calculating a high load probability and a low load probability of the component respectively by using a high load probability calculation formula and a low load probability calculation formula, the high load probability calculation formula=the number of logical threads in the high load state/the number of all the logical threads that are callable by the current component, and the low load probability calculation formula=the number of logical threads in the low load state/the number of all the logical threads that are callable by the current component;

determining whether at least one of the high load probability and the low load probability of the component is greater than a third preset threshold; and determining that the number of logical threads of the component needs to be adjusted if at least one of the high load probability and the low load probability of the component is greater than the third preset threshold.

Optionally, the logical threads run in an operational process, and the method further includes:

determining whether logical threads need to be added or deleted for the component according to the number of logical threads that the component needs to be adjusted and the number of current logical threads;

determining whether logical threads are allowable to be added in an operational process associated with the current logical threads if the logical threads need to be added;

adding the logical threads in the operational process associated with the current logical threads if the logical threads are allowable to be added in the operational process associated with the current logical threads;

determining the number of operational processes that need to be added if the logical threads cannot be added in the operational process associated with the current logical threads; and deleting logical threads in the operational process if the corresponding logical threads need to be deleted.

Optionally, the step of determining whether logical threads are allowable to be added in an operational process associated with the current logical threads includes:

determining a plurality of operational processes associated with the current logical threads;

determining, according to a preset increase formula, the number of logical threads that is allowable to be added in each operational process, the increase formula being: the number of logical threads that is allowable to be added in the operational process=(pre-allocated total resources of the operational process/resources occupied by the operational process for running logical threads*a fourth preset value−1)*the number of logical threads running in the current operational process;

counting the total number of logical threads that is allowable to be added in all the associated operational processes;

determining whether the total number of logical threads that is allowable to be added is greater than or equal to the number of logical threads that need to be added for the component; and determining that the logical threads are allowable to be added in the associated operational processes if the total number of logical threads that is allowable to be added is greater than or equal to the number of logical threads that need to be added for the component.

Optionally, the step of determining the number of operational processes that need to be added includes:

acquiring the number Q of logical threads that is allowable to run in the associated operational processes under a preset load threshold; and calculating, by using an operational process calculation formula, the number of operational processes that need to be added, the operational process calculation formula being: the number of added operational processes=(N−T)/Q+1, wherein N is the number of logical threads that need to be added for the component, T is the number of logical threads that is allowable to be added in the associated operational processes, and T, N and Q are positive integers.

Optionally, the method further includes:

determining, at intervals of a preset time, first logical threads that are callable by an upstream component of a component and second logical threads that are callable by a downstream component; and establishing a communication connection between third logical threads that are callable by the current component and the first logical threads as well as a communication connection between the third logical threads and the second logical threads.

Optionally, the method further includes:

determining sequentially whether any logical thread exists in each operational process associated with the current component; and deleting the operational process if no logical thread exists in the operational process.

In another aspect, the present disclosure further discloses an apparatus for adjusting the number of component logical threads, including:

an acquisition module configured to acquire a plurality of logical threads that is callable by a component;

a first determination module configured to determine a load state of each logical thread according to a utilization rate of a data processing queue corresponding to each logical thread, the load state including a normal load state and an abnormal load state;

a first judgment module configured to determine, according to the load states of the logical threads of the component, whether the number of logical threads of the component needs to be adjusted; and an adjustment module configured to adjust the number of logical threads of the component according to the determination result if the number of logical threads of the component needs to be adjusted.

Optionally, the adjustment module includes:

an adjustment unit configured to adjust the number of logical threads of the component to: the number of current logical threads of the component*the data amount of data sent by a sending apparatus per second/the data amount of data received by the component per second, the sending apparatus being an apparatus that sends data to the component.

Optionally, the abnormal load state includes a high load state and a low load state, and the utilization rate is equal to space occupied by data stored in a message queue/pre-allocated storage space of the message queue; and the determination module includes:

a first judgment unit configured to determine whether a utilization rate of a data processing queue corresponding to a logical thread is greater than a first preset threshold;

a high load state determination unit configured to determine that the logical thread is in a high load state if the utilization rate is greater than the first preset threshold;

a second judgment unit configured to determine whether the utilization rate of the data processing queue corresponding to the current logical thread is less than a second preset threshold if the utilization rate is not greater than the first preset threshold; and a low load state determination unit configured to determine that the logical thread is in a low load state if the utilization rate is less than the second preset threshold.

Optionally, the first determination module includes:

a first counting unit configured to respectively count the number of logical threads in the high load state and the number of logical threads in the low load state among all the logical threads that are callable by the component;

a first calculation unit configured to calculate a high load probability and a low load probability of the component respectively by using a high load probability calculation formula and a low load probability calculation formula, the high load probability calculation formula=the number of logical threads in the high load state/the number of all the logical threads that are callable by the current component, and the low load probability calculation formula=the number of logical threads in the low load state/the number of all the logical threads that are callable by the current component;

a third judgment unit configured to determine whether at least one of the high load probability and the low load probability of the component is greater than a third preset threshold; and a first determination unit configured to determine that the number of logical threads of the component needs to be adjusted if at least one of the high load probability and the low load probability of the component is greater than the third preset threshold.

Optionally, the apparatus further includes:

a second determination module configured to determine whether logical threads need to be added or deleted for the component according to the number of logical threads that the component needs to be adjusted and the number of current logical threads;

a second judgment module configured to determine whether logical threads are allowable to be added in an operational process associated with the current logical threads if the logical threads need to be added;

an adding module configured to add the logical threads in the operational process associated with the current logical threads if the logical threads are allowable to be added in the operational process associated with the current logical threads;

a third determination module configured to determine the number of operational processes that need to be added if the logical threads cannot be added in the operational process associated with the current logical threads; and a deletion module configured to delete logical threads in the operational process if the corresponding logical threads need to be deleted.

Optionally, the second determination module includes:

a second determination unit configured to determine a plurality of operational processes associated with the current logical threads;

a third determination unit configured to determine, according to a preset increase formula, the number of logical threads that is allowable to be added in each operational process, the increase formula being: the number of logical threads that is allowable to be added in the operational process=(total pre-allocated resources of the operational process/resources occupied by the operational process for running logical threads*a fourth preset value−1)*the number of logical threads running in the current operational process;

a second counting unit configured to count the total number of logical threads that is allowable to be added in all the associated operational processes;

a fourth judgment unit configured to determine whether the total number of logical threads that is allowable to be added is greater than or equal to the number of logical threads that need to be added for the component; and a third determination unit configured to determine that the logical threads are allowable to be added in the associated operational processes if the total number of logical threads that is allowable to be added is greater than or equal to the number of logical threads that need to be added for the component.

Optionally, the third determination unit includes:

an acquisition subunit configured to acquire the number Q of logical threads that is allowable to run in the associated operational processes under a preset load threshold; and a calculation subunit configured to calculate, by using an operational process calculation formula, the number of operational processes that need to be added, the operational process calculation formula being: the number of added operational processes=(N−T)/Q+1, wherein N is the number of logical threads that needs to be added for the component, T is the number of logical threads that is allowable to be added in the associated operational processes, and T, N and Q are positive integers.

Optionally, the apparatus further includes:

a fourth determination module configured to determine, at intervals of a preset time, first logical threads that are callable by an upstream component of a component and second logical threads that are callable by a downstream component; and an establishment module configured to establish a communication connection between third logical threads that are callable by the current component and the first logical threads as well as a communication connection between the third logical threads and the second logical threads.

Optionally, the apparatus further includes:

a third judgment module configured to determine sequentially whether any logical thread exists in each operational process associated with the current component; and a deletion module configured to delete the operational process if no logical thread exists in the operational process.

As shown from the above technical solutions that in the example embodiments of the present disclosure, first, a load state of each logical thread is determined according to a utilization rate of a data processing queue corresponding to each logical thread, the load state including a normal load state and an abnormal load state. Then, according to the load states of the logical threads of the component, whether the number of logical threads of the component needs to be adjusted is determined. Finally, the number of logical threads of the component is adjusted according to the determination result if the number of logical threads of the component needs to be adjusted. In the example embodiments of the present disclosure, the number of logical threads that is callable by a component may be adjusted according to load states of the logical threads, thereby preventing logical threads that may be called by a component from being excessive or insufficient, thus improving the utilization rate of logical thread resources while ensuring real-time processing of data.

BRIEF DESCRIPTION OF THE DRAWINGS

To describe the technical solutions in the example embodiments of the present disclosure, the following briefly introduces the accompanying drawings describing the example embodiments. Apparently, the accompanying drawings described in the following merely represent some example embodiments described in the present disclosure, and those of ordinary skill in the art may still derive other drawings from these accompanying drawings without creative efforts.

DETAILED DESCRIPTION

The technical solutions in the example embodiments of the present disclosure will be clearly and completely described below with reference to the accompanying drawings in the example embodiments of the present disclosure. It is apparent that the example embodiments described merely represent some example embodiments rather than all example embodiments of the present disclosure. Based on the example embodiments in the present disclosure, all other example embodiments obtained by those of ordinary skill in the art without creative efforts should belong to the protection scope of the present disclosure.

Figure 1:
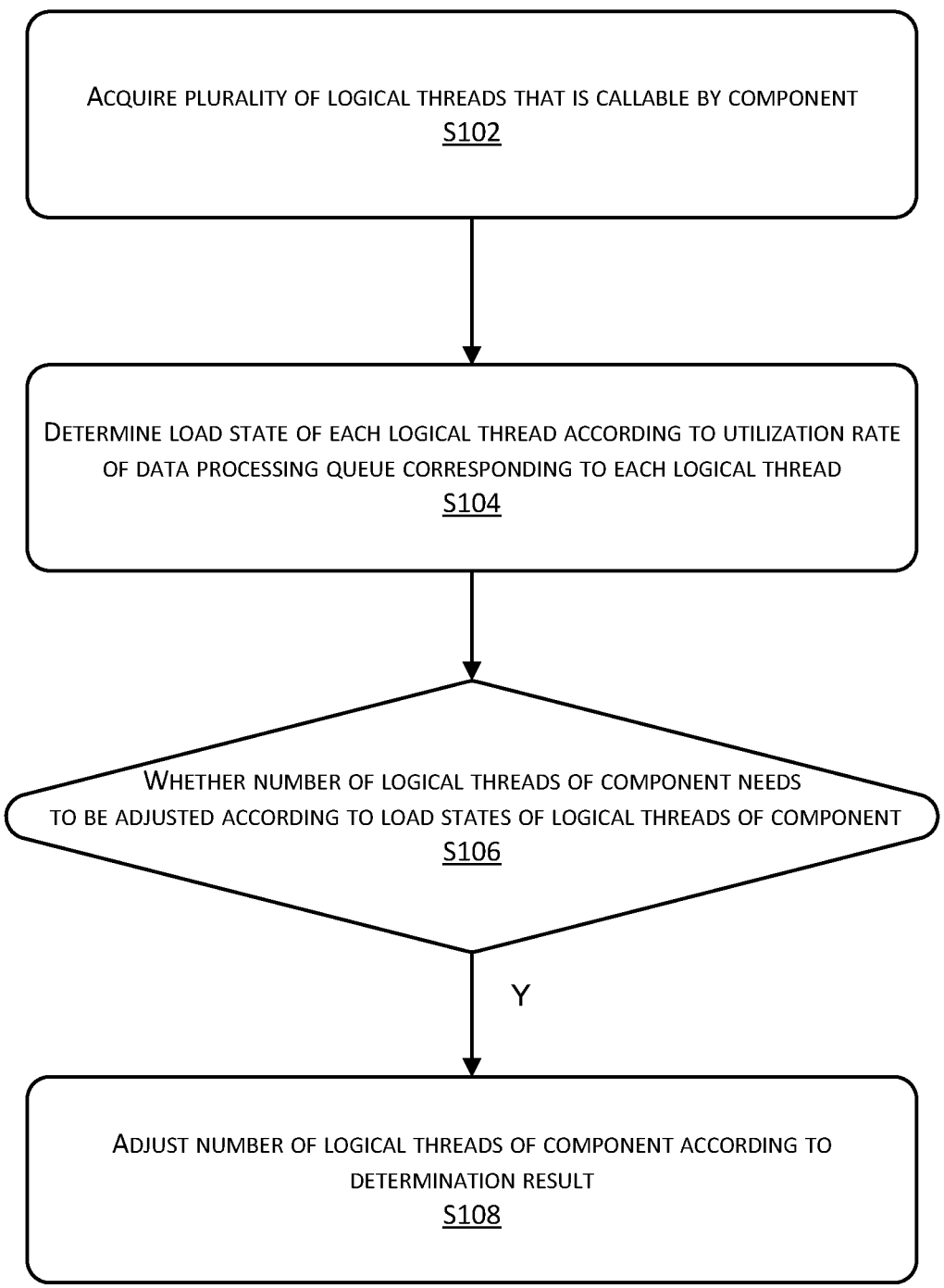
FIG. 1 is a schematic flowchart of a method for adjusting the number of component logical threads according to an example embodiment of the present disclosure.

The present disclosure discloses a method for adjusting the number of component logical threads. As shown in FIG. 1, the method at least includes the following steps:

Step S102: A plurality of logical threads that is callable by a component is acquired.

Step S104: A load state of each logical thread is determined according to a utilization rate of a data processing queue corresponding to each logical thread, the load state including a normal load state and an abnormal load state.

Figure 2:
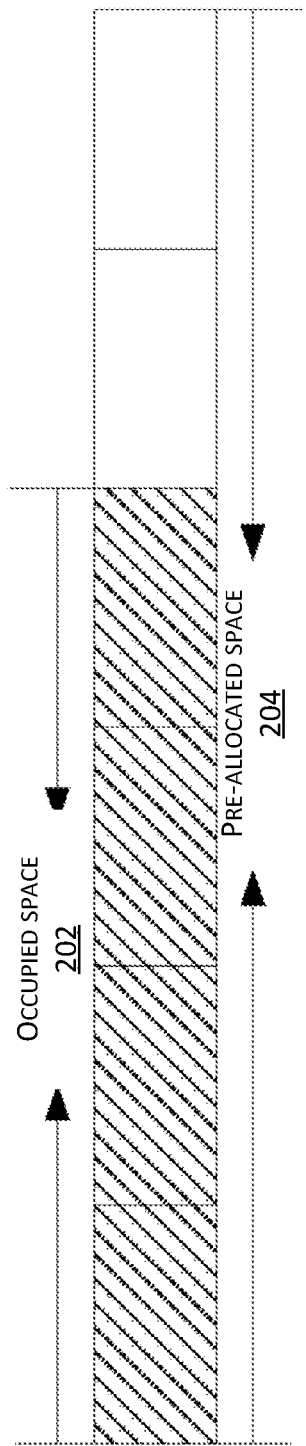
FIG. 2 is a schematic diagram of a data processing queue according to an example embodiment of the present disclosure.

In the example embodiment of the present disclosure, there is a data processing queue inside each logical thread. The data processing queue is used to store data that needs to be processed by the corresponding logical thread. In the example embodiment of the present disclosure, the data processing queue may be as shown in FIG. 2. A shaded portion represents occupied space 202 that is already occupied by data stored in the processing queue. Both the shaded portion and blank portion represents pre-allocated space 204 that is allocated to the data processing queue.

In the example embodiment of the present disclosure, a utilization rate of a message queue=space occupied by data stored in the message queue/pre-allocated storage space of the message queue. Thus, a load state, i.e., a normal load state or an abnormal load state, of a corresponding logical thread may be determined according to a utilization rate of a message queue. The abnormal load state may, for example, include a high load state with an excessively high utilization rate and a low load state with an excessively low utilization rate. In the high load state, the logical thread cannot ensure real-time processing of data. In the low load state, logical thread resources allocated to the component will be wasted.

Step S106: whether the number of logical threads of the component needs to be adjusted is determined according to the load states of the logical threads of the component; if yes, step S108 is performed; otherwise, the procedure ends.

In the example embodiment of the present disclosure, it may be determined, according to a proportion of logical threads in the normal load state or the abnormal load state in all the logical threads that are callable by the component, whether the number of logical threads of a component needs to be adjusted. For example, if logical threads in the normal load state account for 80% of logical threads that may be called by a component, it may be determined that the number of logical threads of the component does not need to be adjusted. If logical threads in the abnormal load state account for 80%, it may be determined that the number of logical threads of the component needs to be adjusted.

Step S108: The number of logical threads of the component is adjusted according to the determination result.

In the example embodiment of the present disclosure, the number of logical threads of the component may be adjusted to: the number of current logical threads of the component*the data amount of data sent by a sending apparatus per second/the data amount of data received by the component per second, the sending apparatus being an apparatus that sends data to the component.

Figure 3:
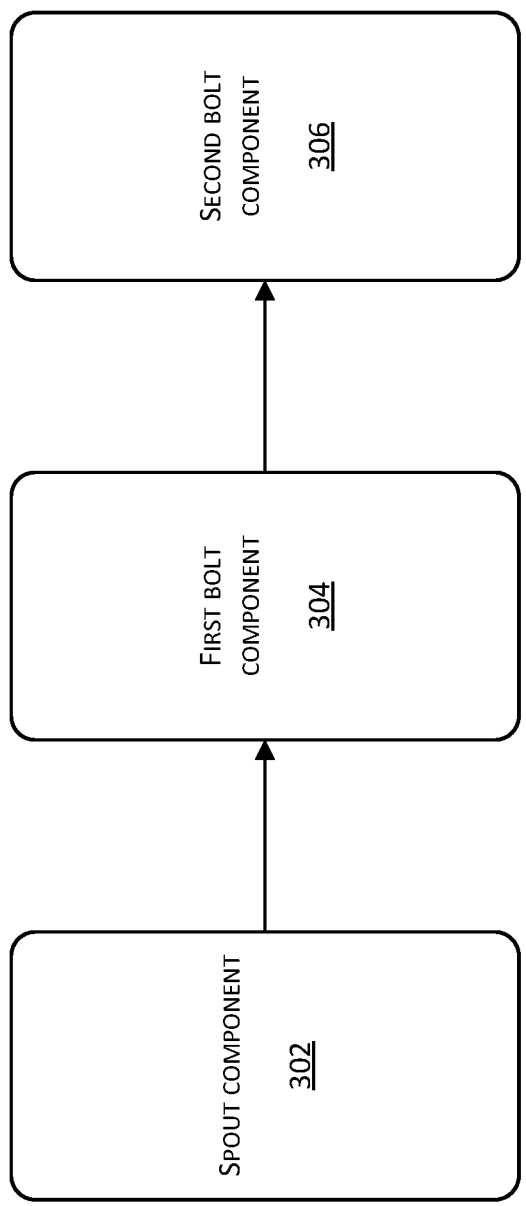
FIG. 3 is a schematic diagram of logical threads according to an example embodiment of the present disclosure.

In the example embodiment of the present disclosure, a real-time computing program is generally composed of a Spout (message source) component and a Blot (message processing) component. A plurality of components may process data iteratively. As shown in FIG. 3, for example, a real-time computing program is composed of one Spout component 302 and two Bolt components, and the two Bolt components are a first Bolt component 304 and a second Bolt component 306 respectively. In the example embodiment of the present disclosure, the Spout component may receive data sent from a message source, and call pre-allocated logical threads to process the data. Upon completion of the processing, the Spout component serves as an upstream component to send the data to the first Bolt component that serves as a downstream component. Likewise, upon completion of the data processing, the first Bolt component will serve as an upstream component to send the data to the second Bolt component that serves as a downstream component. In the example embodiment of the present disclosure, if the current component is a Spout component, the sending apparatus may be a message source device. If the current component is a Bolt component, the sending apparatus may be an upstream component of the current component.

As shown from the above technical solution that in the example embodiment of the present disclosure, first, a load state of each logical thread is determined according to a utilization rate of a data processing queue corresponding to each logical thread, the load state including a normal load state and an abnormal load state. Then, it is determined according to the load states of the logical threads of the component whether the number of logical threads of the component needs to be adjusted. Finally, the number of logical threads of the component is adjusted according to the determination result if the number of logical threads of the component needs to be adjusted. In the example embodiment of the present disclosure, the number of logical threads that may be called by a component may be adjusted according to load states of the logical threads, preventing logical threads that may be called by a component from being excessive or insufficient, thus improving the utilization rate of logical thread resources while ensuring real-time processing of data.

Figure 4:
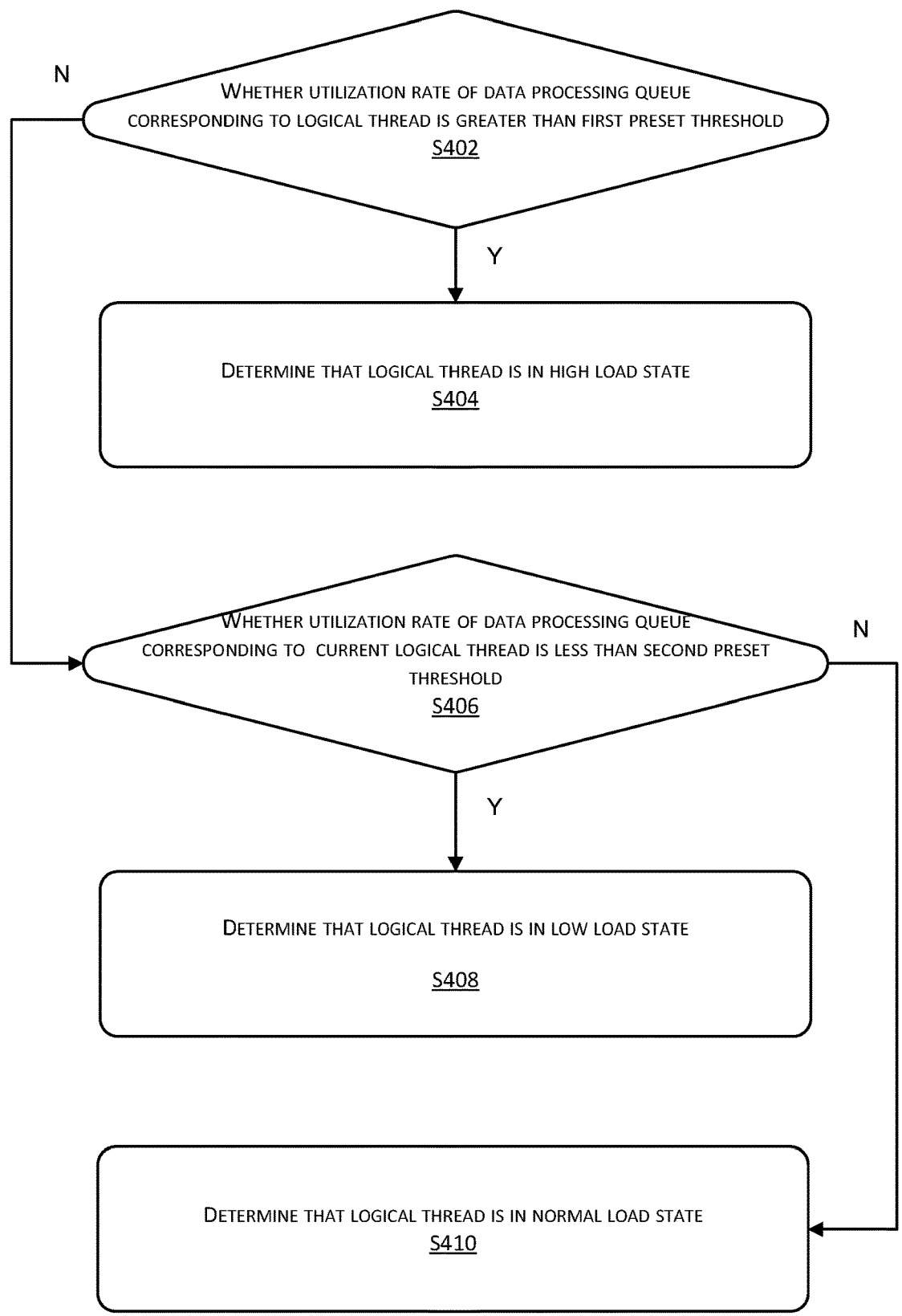
FIG. 4 is a schematic flowchart of a method for adjusting the number of component logical threads according to an example embodiment of the present disclosure.

In another feasible example embodiment of the present disclosure, as shown in FIG. 4, step S104 in all the foregoing example embodiments may include the following steps:

Step S402: whether a utilization rate of a data processing queue corresponding to a logical thread is greater than a first preset threshold is determined; if yes, step S404 is performed; otherwise, step S406 is performed.

In the example embodiment of the present disclosure, a user may set the value of the first preset threshold on his/her own as required. In an example embodiment, the first preset threshold is 80%.

Step S404: the logical thread is determined in a high load state.

In the example embodiment of the present disclosure, when a utilization rate of a data processing queue corresponding to a logical thread is greater than the first preset threshold, it indicates that the logical thread has a large amount of data to be processed but fails to process the data in real time, and it is determined that the logical thread is in a high load state.

Step S406: whether the utilization rate of the data processing queue corresponding to the current logical thread is less than a second preset threshold is determined; if yes, step S408 is performed; otherwise, step S410 is performed.

In the example embodiment of the present disclosure, the user may also set the value of the second preset threshold on his/her own as required. In an example embodiment, the second preset threshold is 20%.

Step S408: the logical thread is determined in a low load state.

In the example embodiment of the present disclosure, when a utilization rate of a data processing queue corresponding to a logical thread is less than the second preset threshold, it indicates that the logical thread is idle and wastes resources, and it is determined that the logical thread is in a low load state.

Step S410: the logical thread is determined in a normal load state.

In the example embodiment of the present disclosure, when a utilization rate of a data processing queue corresponding to a logical thread is greater than or equal to the second preset threshold and less than or equal to the first preset threshold, it indicates that the logical thread may process data normally, that is, the logical thread may ensure real-time processing of data without wasting resources. Thus, it is determined that the logical thread is in a normal load state.

As shown from the above, by using the method in the example embodiment of the present disclosure, a load state of a logical thread may be determined, and then load states of all logical threads that may be called by a component may be determined.

Figure 5:
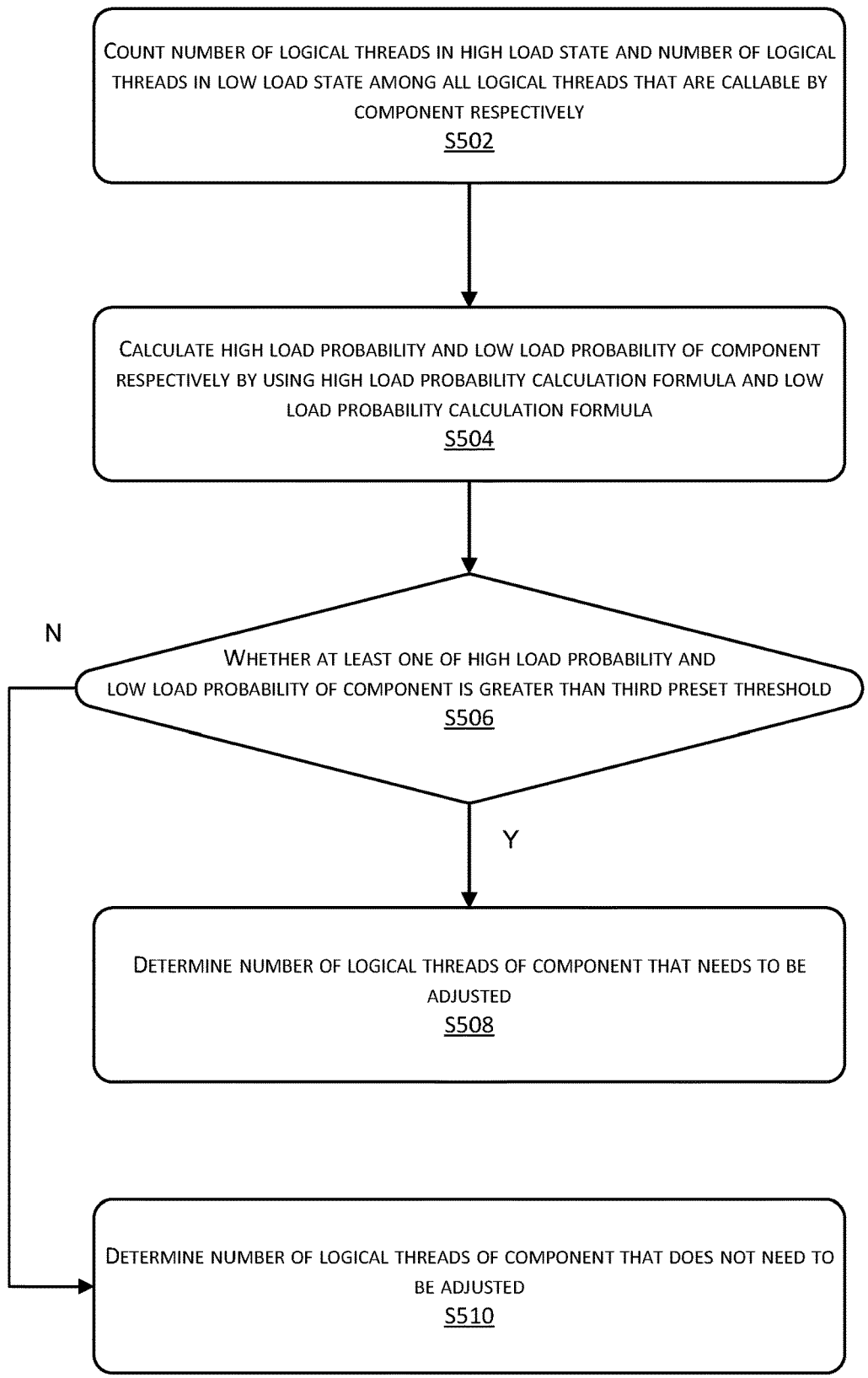
FIG. 5 is a schematic flowchart of a method for adjusting the number of component logical threads according to an example embodiment of the present disclosure.

In another feasible example embodiment of the present disclosure, as shown in FIG. 5, step S106 in the all the foregoing example embodiments may include the following steps:

Step S502: The number of logical threads in the high load state and the number of logical threads in the low load state among all the logical threads that are callable by the component are counted respectively.

Step S504: A high load probability and a low load probability of the component are calculated respectively by using a high load probability calculation formula and a low load probability calculation formula, the high load probability calculation formula=the number of logical threads in the high load state/the number of all the logical threads that are callable by the current component, and the low load probability calculation formula=the number of logical threads in the low load state/the number of all the logical threads that are callable by the current component.

In the example embodiment of the present disclosure, in order to improve the accuracy, load states of all the logical threads in the current component may be collected at intervals of a preset time. After the load states of all the logical threads have been collected a preset number of times, the number of logical threads in the high load state and the number of logical threads in the low load state are counted. Then, a high load probability and a low load probability of the component are calculated by using the following calculation formulas: the high load probability calculation formula=the number of logical threads in the high load state/the number of all the logical threads that are callable by the current component*a preset number of times, and the low load probability calculation formula=the number of logical threads in the low load state/the number of all the logical threads that are callable by the current component*a preset number of times.

Step S506: whether at least one of the high load probability and the low load probability of the component is greater than a third preset threshold is determined; if yes, step S508 is performed; otherwise, step S510 is performed.

In the example embodiment of the present disclosure, the user may set the value of the third preset threshold on his/her own as required. In an example embodiment, the third preset threshold may be set to 80%.

In the example embodiment of the present disclosure, step S508 may be performed when the high load probability of the component is greater than the third preset threshold; or step S508 may be performed when the low load probability of the component is greater than the third preset threshold; or step S508 may be performed when both the high load probability and the low load probability of the component are greater than the third preset threshold.

Step S508: the number of logical threads of the component that needs to be adjusted is determined.

Step S510: the number of logical threads of the component that does not need to be adjusted is determined.

As shown from the above, in the example embodiment of the present disclosure, whether the number of logical threads of a component needs to be adjusted is determined.

Figure 6:
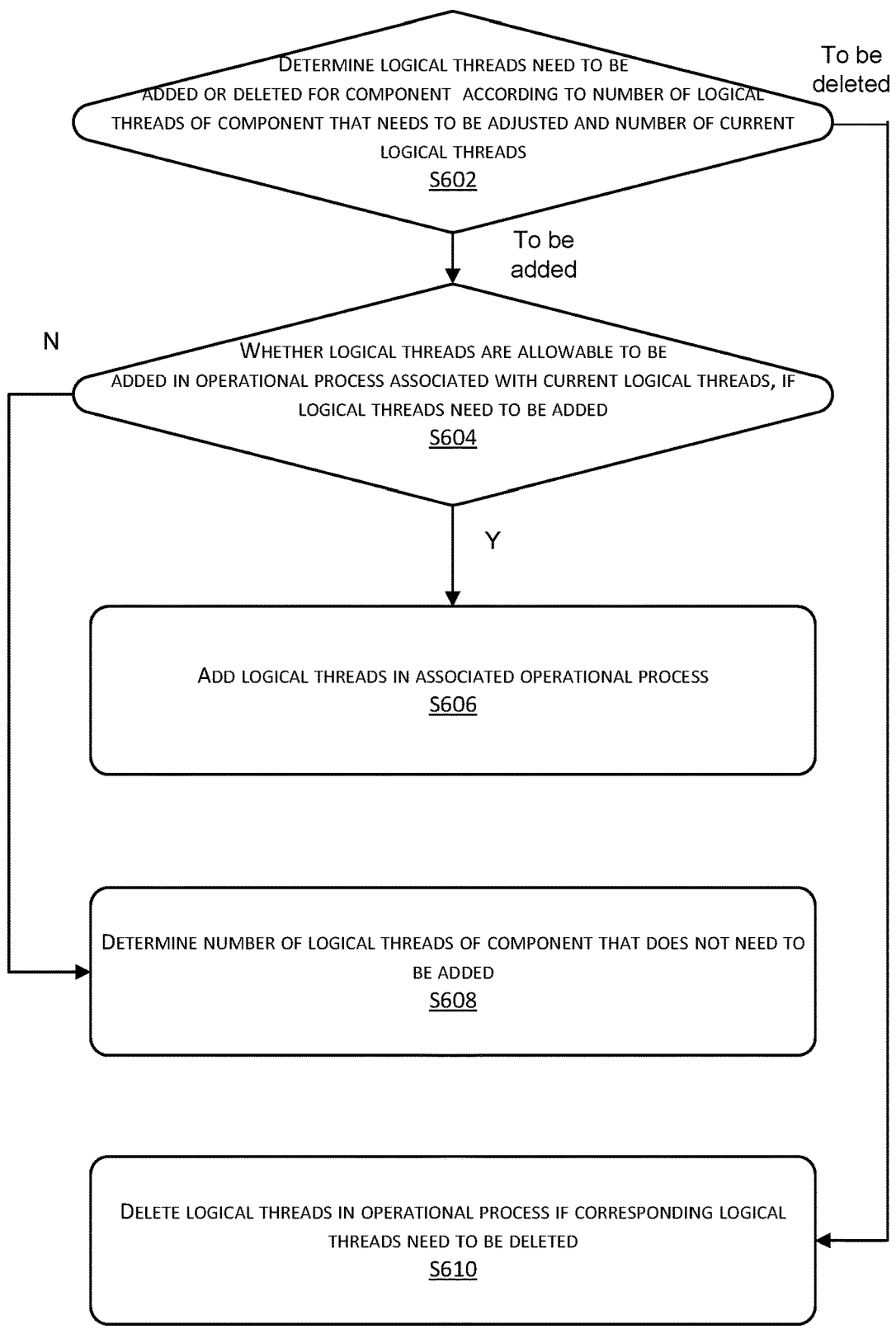
FIG. 6 is a schematic flowchart of a method for adjusting the number of component logical threads according to an example embodiment of the present disclosure.

In another feasible example embodiment of the present disclosure, the logical threads in all the foregoing example embodiments all run in an operational process. As shown in FIG. 6, the method in all the foregoing example embodiments may further include the following steps:

Step S602: logical threads need to be added or deleted for the component are determined according to the number of logical threads of the component that needs to be adjusted and the number of current logical threads.

In the example embodiment of the present disclosure, it is assumed that the number of logical threads of a component needs to be adjusted to 3 upon calculation by using the foregoing method, and the number of current logical threads of the component is 5. Then, it may be determined that two logical threads of the component need to be deleted currently.

Step S604: whether logical threads are allowable to be added in an operational process associated with the current logical threads is determined, if the logical threads need to be added; if yes, step S606 is performed; otherwise, step S608 is performed.

In the example embodiment of the present disclosure, the operational process associated with the current logical threads includes all operational processes in a computer cluster where the current logical threads are located.

Step S606: The logical threads are added in the operational process associated with the current logical threads.

Step S608: The number of operational processes that need to be added is determined.

Step S610: Logical threads are deleted in the operational process if the corresponding logical threads need to be deleted.

In the example embodiment of the present disclosure, all logical threads of a component are at the same level. Therefore, in the example embodiment of the present disclosure, the number of logical threads that need to be deleted may be determined according to a difference between the number of current logical threads of the component and the number of logical threads after adjustment. Then, a corresponding number of logical threads are deleted from the current component at random.

It is thus clear that in the example embodiment of the present disclosure, logical threads of a current component may be added or deleted.

Figure 7:
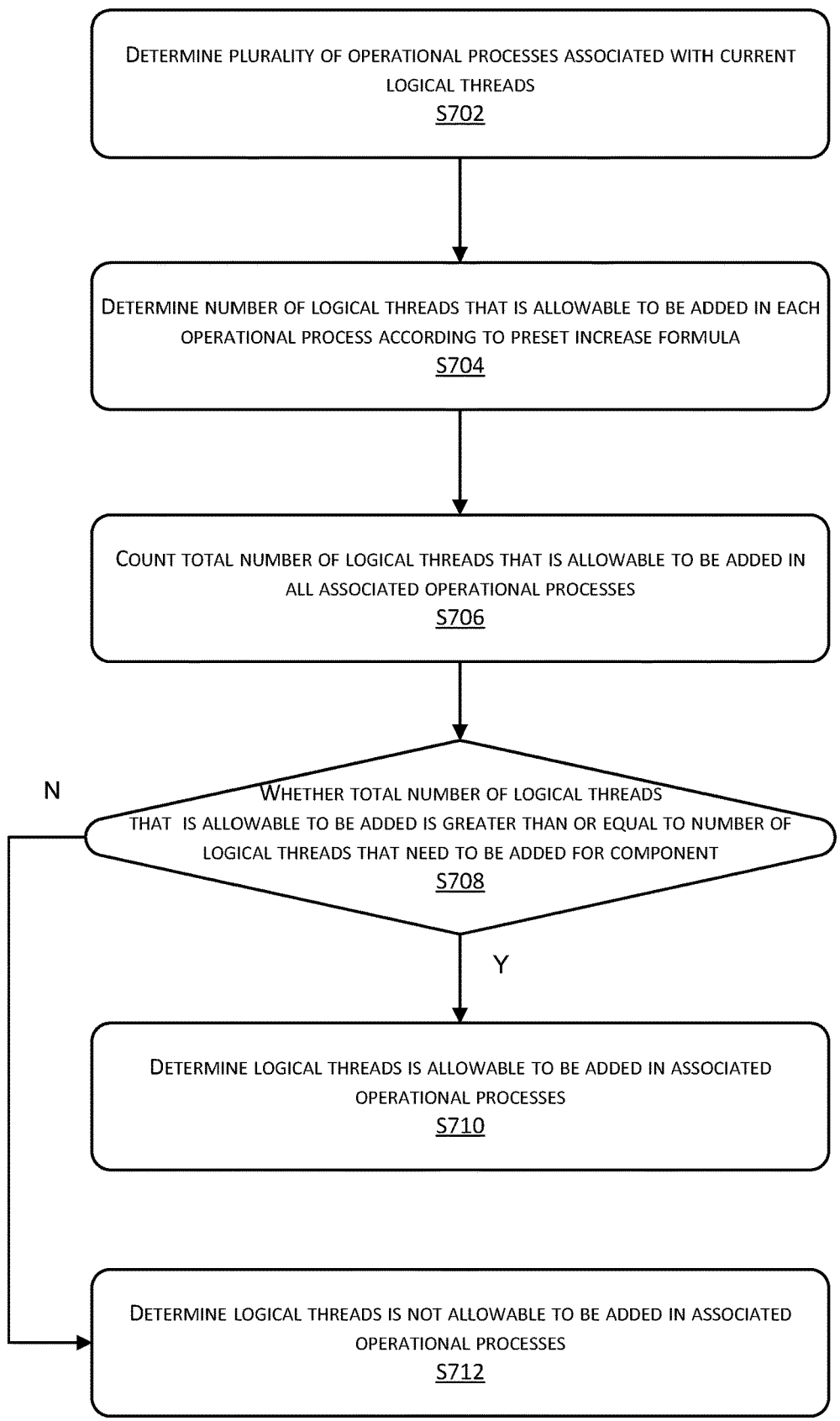
FIG. 7 is a schematic flowchart of a method for adjusting the number of component logical threads according to an example embodiment of the present disclosure.

In another feasible example embodiment of the present disclosure, as shown in FIG. 7, step S604 in all the foregoing example embodiments may include the following steps:

Step S702: A plurality of operational processes associated with the current logical threads is determined.

In the example embodiment of the present disclosure, as stated above, the plurality of associated operational processes includes all operational processes in a computer cluster where the component is located.

Step S704: The number of logical threads that is allowable to be added in each operational process is determined according to a preset increase formula, the increase formula being: the number of logical threads that is allowable to be added in the operational process=(total pre-allocated resources of the operational process/resources occupied by the operational process for running logical threads*a fourth preset value−1)*the number of logical threads running in the current operational process.

In the example embodiment of the present disclosure, the total pre-allocated resources of the operational process may be CPU resources or storage space pre-allocated to the operational process, and the resources occupied by the operational process for running logical threads may be CPU resources or storage space occupied by the operational process for running the logical threads.

In the example embodiment of the present disclosure, the user may set the value of the fourth preset threshold on his/her own as required. In an example embodiment, the fourth preset threshold may be set to 80%.

Step S706: The total number of logical threads that is allowable to be added in all the associated operational processes is counted.

In the example embodiment of the present disclosure, it is assumed that there are three operational processes in a computer cluster where the current component is located, which are a first operational process, a second operational process and a third operational process respectively, and it is determined by using the method provided in step S704 that two logical threads are allowable to be added to the first operational process, three logical threads are allowable to be added to the second operational process, and three logical threads are allowable to be added to the third operational process. Then, the total number of logical threads that is allowable to be added to the whole computer cluster is: 8=2+3+3.

Step S708: whether the total number of logical threads that is allowable to be added is greater than or equal to the number of logical threads that need to be added for the component is determined; if yes, step S710 is performed; otherwise, step S712 is performed.

Step S710: the logical threads are determined to be allowable to be added in the associated operational processes.

Step S712: the logical threads are determined not to be allowable to be added in the associated operational processes.

It is thus clear that in the example embodiment of the present disclosure, it may be determined whether to add logical threads that need to be added for a current component in operational processes associated with the current component.

Figure 8:
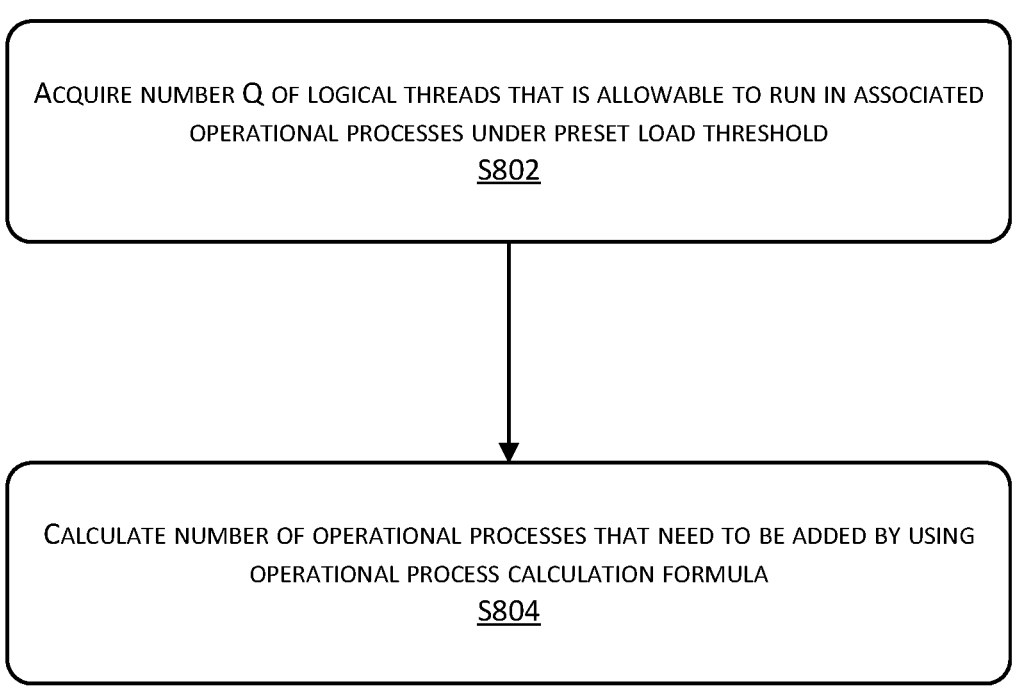
FIG. 8 is a schematic flowchart of a method for adjusting the number of component logical threads according to an example embodiment of the present disclosure.

In still another feasible example embodiment of the present disclosure, as shown in FIG. 8, step S608 in all the foregoing example embodiments may include the following steps:

Step S802: The number Q of logical threads that is allowable to run in the associated operational processes under a preset load threshold is acquired.

In the example embodiment of the present disclosure, the preset load threshold may be 80% of a load limit of the operational processes.

Step S804: The number of operational processes that need to be added is calculated by using an operational process calculation formula, the operational process calculation formula being: the number of operational processes added= $(N-T)/Q+1$, wherein N is the number of logical threads that need to be added for the component, T is the number of logical threads that is allowable to be added in the associated operational processes, and T, N and Q are positive integers.

It is thus clear that the number of operational processes that need to be added may be determined by using the foregoing method.

In still another feasible example embodiment of the present disclosure, when a first component and a second component transmit data, the method in all the foregoing example embodiments may further include:

determining, at intervals of a preset time, first logical threads that are callable by an upstream component of a component and second logical threads that are callable by a downstream component; and establishing a communication connection between third logical threads that are callable by the current component and the first logical threads as well as a communication connection between the third logical threads and the second logical threads.

As stated above, a component may include an upstream component and a downstream component. The number of logical threads that may be called by each component varies by using the method in the example embodiment of the present disclosure. Normal data transmission of logical threads between upstream and downstream components may be determined by using the method disclosed in the present disclosure.

In still another feasible example embodiment of the present disclosure, the method in all the foregoing example embodiments may further include:

determining sequentially whether any logical thread exists in each operational process associated with the current component; and deleting the operational process if no logical thread exists in the operational process.

In the example embodiment of the present disclosure, when an operation of deleting logical threads is performed, it may cause an operational process to be empty of logical threads. In this case, the operational process does not execute any task. Resources occupied by the operational process may be released in time by using the method disclosed in the present disclosure.

From the description of the method example embodiments above, those skilled in the art may clearly understand that the present disclosure may be implemented by software plus a necessary universal hardware platform, and certainly may also be implemented by hardware. However, the former is an example implementation under most circumstances. Based on such an understanding, the technical solutions of the present disclosure essentially or the part making contributions to the conventional techniques may be embodied in the form of a software product. The computer software product may be stored in a storage medium, and includes several instructions for instructing a computer device (which may be a personal computer, a server, a network device, or the like) to perform all or some of the steps of the methods described in the example embodiments of the present disclosure. The foregoing storage medium includes: any medium that may store program codes, such as a Read-Only Memory (ROM), a Random Access Memory (RAM), a magnetic disk, or an optical disc.

Figure 9:
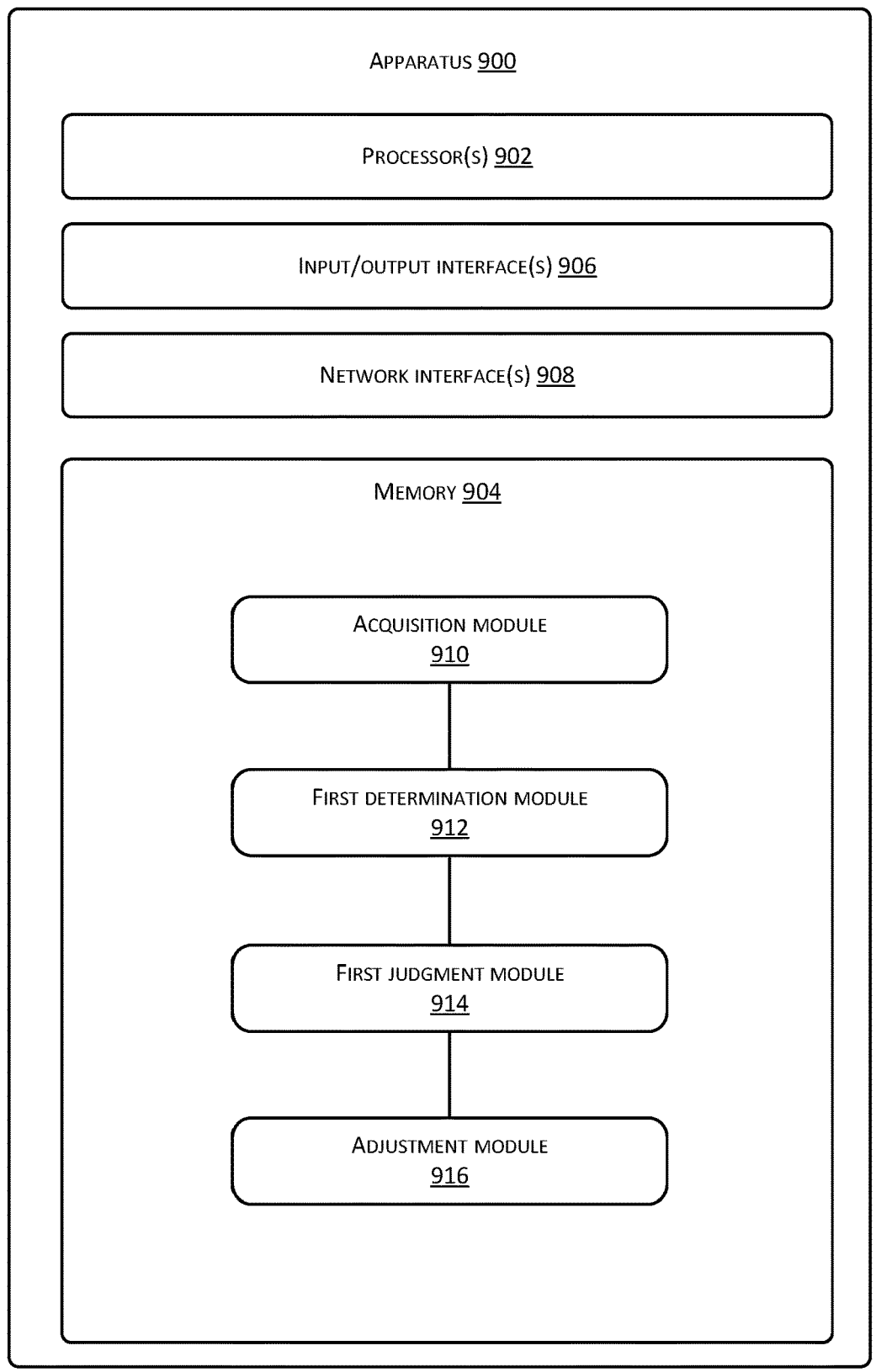
FIG. 9 is a schematic modular diagram of an apparatus for adjusting the number of component logical threads according to an example embodiment of the present disclosure.

Corresponding to the example embodiment of the method for adjusting the number of component logical threads provided in the present disclosure, the present disclosure further provides an apparatus for adjusting the number of component logical threads. As shown in FIG. 9, an apparatus 900 includes one or more processor(s) 902 or data processing unit(s) and memory 904. The apparatus 900 may further include one or more input/output interface(s) 906 and one or more network interface(s) 908. The memory 904 is an example of computer readable media.

The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media (transitory media) such as a modulated data signal and carrier.

The memory 904 may store therein a plurality of modules or units including:

an acquisition module 910 configured to acquire a plurality of logical threads that is callable by a component;

a first determination module 912 configured to determine a load state of each logical thread according to a utilization rate of a data processing queue corresponding to each logical thread, the load state including a normal load state and an abnormal load state;

a first judgment module 914 configured to determine, according to the load states of the logical threads of the component, whether the number of logical threads of the component needs to be adjusted; and an adjustment module 916 configured to adjust the number of logical threads of the component according to the determination result if the number of logical threads of the component needs to be adjusted.

In the example embodiment of the present disclosure, the function of the adjustment module 916 may be implemented by an adjustment unit. The adjustment unit is configured to adjust the number of logical threads of the component to: the number of current logical threads of the component*the data amount of data sent by a sending apparatus per second/the data amount of data received by the component per second, the sending apparatus being an apparatus that sends data to the component.

A shown from the above technical solution, in the example embodiment of the present disclosure, first, a load state of each logical thread is determined according to a utilization rate of a data processing queue corresponding to each logical thread, the load state including a normal load state and an abnormal load state. Then, it is determined according to the load states of the logical threads of the component whether the number of logical threads of the component needs to be adjusted. Finally, the number of logical threads of the component is adjusted according to the determination result if the number of logical threads of the component needs to be adjusted. In the example embodiment of the present disclosure, the number of logical threads that may be called by a component may be adjusted according to load states of the logical threads, preventing logical threads that may be called by a component from being excessive or insufficient, thus improving the utilization rate of logical thread resources while ensuring real-time processing of data.

In another feasible example embodiment of the present disclosure, the abnormal load state in all the foregoing example embodiments includes a high load state and a low load state, and the utilization rate is equal to space occupied by data stored in a message queue/pre-allocated storage space of the message queue; and the determination module includes:

a first judgment unit configured to determine whether a utilization rate of a data processing queue corresponding to a logical thread is greater than a first preset threshold;

a high load state determination unit configured to determine that the logical thread is in a high load state if the utilization rate is greater than the first preset threshold;

a second judgment unit configured to determine whether the utilization rate of the data processing queue corresponding to the current logical thread is less than a second preset threshold if the utilization rate is not greater than the first preset threshold; and a low load state determination unit configured to determine that the logical thread is in a low load state if the utilization rate is less than the second preset threshold.

It is thus clear that in the example embodiment of the present disclosure, a load state of a logical thread may be determined.

In still another feasible example embodiment of the present disclosure, the first judgment module in all the foregoing example embodiments includes:

a first counting unit configured to respectively count the number of logical threads in the high load state and the number of logical threads in the low load state among all the logical threads that are callable by the component;

a first calculation unit configured to calculate a high load probability and a low load probability of the component respectively by using a high load probability calculation formula and a low load probability calculation formula, the high load probability calculation formula=the number of logical threads in the high load state/the number of all the logical threads that are callable by the current component, and the low load probability calculation formula=the number of logical threads in the low load state/the number of all the logical threads that are callable by the current component;

a third judgment unit configured to determine whether at least one of the high load probability and the low load probability of the component is greater than a third preset threshold; and a first determination unit configured to determine that the number of logical threads of the component needs to be adjusted if at least one of the high load probability and the low load probability of the component is greater than the third preset threshold.

It is thus clear that in the example embodiment of the present disclosure, it may be determined whether the number of logical threads of a component needs to be adjusted.

In still another feasible example embodiment of the present disclosure, the apparatus in all the foregoing example embodiments may further include:

a second determination module configured to determine whether logical threads need to be added or deleted for the component according to the number of logical threads that the component needs to have after adjustment and the number of current logical threads;

a second judgment module configured to determine whether logical threads are allowable to be added in an operational process associated with the current logical threads if the logical threads need to be added;

an adding module configured to add the logical threads in the operational process associated with the current logical threads if the logical threads are allowable to be added in the operational process associated with the current logical threads;

a third determination module configured to determine the number of operational processes that need to be added if the logical threads cannot be added in the operational process associated with the current logical threads; and a deletion module configured to delete logical threads in the operational process if the corresponding logical threads need to be deleted.

It is thus clear that in the example embodiment of the present disclosure, logical threads are allowable to be added or deleted.

In another feasible example embodiment of the present disclosure, the second judgment module in all the foregoing example embodiments includes:

a second determination unit configured to determine a plurality of operational processes associated with the current logical threads;

a third determination unit configured to determine, according to a preset increase formula, the number of logical threads that is allowable to be added in each operational process, the increase formula being: the number of logical threads that is allowable to be added in the operational process=(total pre-allocated resources of the operational process/resources occupied by the operational process for running logical threads*a fourth preset value-1)*the number of logical threads running in the current operational process;

a second counting unit configured to count the total number of logical threads that is allowable to be added in all the associated operational processes;

a fourth judgment unit configured to determine whether the total number of logical threads that is allowable to be added is greater than or equal to the number of logical threads that need to be added for the component; and a third determination unit configured to determine that the logical threads are allowable to be added in the associated operational processes if the total number of logical threads that is allowable to be added is greater than or equal to the number of logical threads that need to be added for the component.

It is thus clear that in the example embodiment of the present disclosure, it may be determined whether logical threads are allowable to be added in the associated operational processes.

In another feasible example embodiment of the present disclosure, the third determination unit in all the foregoing example embodiments includes:

an acquisition subunit configured to acquire the number Q of logical threads that is allowable to run in the associated operational processes under a preset load threshold; and a calculation subunit configured to calculate, by using an operational process calculation formula, the number of operational processes that need to be added, the operational process calculation formula being: the number of operational processes added=(N−T)/Q+1, wherein N is the number of logical threads that need to be added for the component, T is the number of logical threads that is allowable to be added in the associated operational processes, and T, N and Q are positive integers.

It is thus clear that in the example embodiment of the present disclosure, the number of newly added operational processes may be determined.

In another feasible example embodiment of the present disclosure, the apparatus in all the foregoing example embodiments further includes:

a fourth determination module configured to determine, at intervals of a preset time, first logical threads that are callable by an upstream component of a component and second logical threads that are callable by a downstream component; and an establishment module configured to establish a communication connection between third logical threads that are callable by the current component and the first logical threads as well as a communication connection between the third logical threads and the second logical threads.

It is thus clear that in the example embodiment of the present disclosure, normal communication between upstream and downstream components may be ensured.

In another feasible example embodiment of the present disclosure, the apparatus in all the foregoing example embodiments further includes:

a third judgment module configured to determine sequentially whether any logical thread exists in each operational process associated with the current component; and a deletion module configured to delete the operational process if no logical thread exists in the operational process.

It is thus clear that in the example embodiment of the present disclosure, an empty operational process may be deleted.

It should be noted that in the text, the relation terms such as "first" and "second" are merely used to distinguish one entity or operation from another entity or operation, but do not necessarily require or imply such an actual relation or order between the entities or operations. Moreover, the terms "include", "comprise" or other variations thereof are intended to cover non-exclusive inclusion, so that a process, a method, an article or a device including a series of elements not only includes the elements, but also includes other elements not clearly listed, or further includes inherent elements of the process, method, article or device. In the absence of more limitations, an element defined by "including a/an . . . " does not exclude that the process, method, article or device including the element further has other identical elements.

The above descriptions are merely implementations of the present disclosure, enabling those skilled in the art to understand or implement the present disclosure. A variety of modifications to the example embodiments will be apparent for those skilled in the art. General principles defined in this text may be implemented in other example embodiments without departing from the spirit or scope of the present disclosure. Therefore, the present disclosure will not be limited to the example embodiments shown in this text, and will be in line with the broadest scope consistent with the principles and novelties disclosed in this text.

The present disclosure may further be understood with clauses as follows.

Clause 1. A method for adjusting a number of logical threads of a component, the method comprising:

acquiring a plurality of logical threads that is callable by a component;

determining a load state of each logical thread according to a utilization rate of a data processing queue corresponding to each logical thread, the load state including a normal load state and an abnormal load state;

determining, according to load states of the logical threads of the component, whether a number of logical threads of the component needs to be adjusted; and adjusting the number of logical threads of the component according to a result of the determining in response to determining that the number of logical threads of the component needs to be adjusted.

Clause 2. The method of clause 1, wherein the adjusting the number of logical threads of the component according to the result of the determining comprises:

adjusting the number of logical threads of the component to be: a number of current logical threads of the component*amount of data sent by a sending apparatus per second/amount of data received by the component per second, the sending apparatus being an apparatus that sends data to the component.

Clause 3. The method of clause 1 or 2, wherein:

the abnormal load state includes a high load state and a low load state;

the utilization rate is equal to a space occupied by data stored in a message queue/a pre-allocated storage space of the message queue; and the determining the load state of each logical thread according to the utilization rate of the data processing queue corresponding to each logical thread comprises:

determining whether the utilization rate of the data processing queue corresponding to a logical thread is greater than a first preset threshold;

determining that the logical thread is in the high load state in response to determining that the utilization rate is greater than the first preset threshold;

determining whether the utilization rate of the data processing queue corresponding to the logical thread is less than a second preset threshold in response to determining that the utilization rate is not greater than the first preset threshold; and determining that the logical thread is in the low load state in response to determining that the utilization rate is less than the second preset threshold.

Clause 4. The method of clause 3, wherein the determining, according to the load states of the logical threads of the component, whether the number of logical threads of the component needs to be adjusted comprises:

respectively counting a number of logical threads in the high load state and a number of logical threads in the low load state among all the logical threads that are callable by the component;

calculating a high load probability and a low load probability of the component by using a high load probability calculation formula and a low load probability calculation formula respectively, the high load probability calculation formula=the number of logical threads in the high load state/the number of all the logical threads that are callable by the component, and the low load probability calculation formula=the number of logical threads in the low load state/the number of all the logical threads that are callable by the component;

determining whether at least one of the high load probability and the low load probability of the component is greater than a third preset threshold; and determining that the number of logical threads of the component needs to be adjusted in response to determining that at least one of the high load probability and the low load probability of the component is greater than the third preset threshold.

Clause 5. The method of any of clauses 1, 2 and 4, wherein:

the logical threads run in an operational process; and the method further comprises:

determining whether the logical threads need to be added or deleted for the component according to the number of logical threads that needs to be adjusted for the component and the number of current logical threads;

determining whether logical threads are allowable to be added in the operational process associated with the current logical threads in response to determining that the logical threads need to be added;

adding the logical threads in the associated operational process in response to determining that the logical threads are allowable to be added in the operational process;

determining a number of operational processes that need to be added in response to determining the logical threads that are not allowable to be added in the operational process; and deleting logical threads in the operational process in response to determining that the corresponding logical threads need to be deleted.

Clause 6. The method of clause 5, wherein the determining whether the logical threads are allowable to be added in the operational process associated with the current logical threads comprises:

determining a plurality of operational processes associated with the current logical threads;

determining, according to a preset increase formula, a number of logical threads that is allowable to be added in each operational process, the preset increase formula being a number of logical threads that is allowable to be added in the operational process=(total pre-allocated resources of the operational process/resources occupied by the respective operational process for running logical threads*a fourth preset value−1)*a number of logical threads running in the current operational process;

counting the total number of logical threads that is allowable to be added in all associated operational processes;

determining whether the total number of logical threads that is allowable to be added is greater than or equal to the number of logical threads that need to be added for the component; and determining that the logical threads are allowable to be added in the associated operational processes in response to determining that the total number of logical threads that is allowable to be added is greater than or equal to the number of logical threads that need to be added for the component.

Clause 7. The method of clause 6, wherein the determining the number of operational processes that need to be added comprises:

acquiring a number Q of logical threads that is allowable to run in the associated operational processes under a preset load threshold; and calculating, by using an operational process calculation formula, the number of operational processes that need to be added, the operational process calculation formula being a number of added operational processes=(N−T)/Q+1, wherein N is a number of logical threads that need to be added for the component, T is the number of logical threads that is allowable to be added in the associated operational processes, and T, N and Q are positive integers.

Clause 8. The method of any of clauses 1, 2, 4, 6 and 7, further comprising:

determining, at intervals of a preset time, first logical threads that are callable by an upstream component of the component and second logical threads that are callable by a downstream component of the component; and establishing a communication connection between third logical threads that are callable by the component and the first logical threads as well as a communication connection between the third logical threads and the second logical threads.

Clause 9. The method of any of clauses 1, 2, 4, 6 and 7, further comprising:

determining sequentially whether a logical thread exits in an operational process associated with the component; and deleting the operational process in response to determining that no logical thread exists in the operational process.

Clause 10. An apparatus for adjusting the number of component logical threads, the apparatus comprising:

an acquisition module configured to acquire a plurality of logical threads that is callable by a component;

a first determination module configured to determine a load state of each logical thread according to a utilization rate of a data processing queue corresponding to each logical thread, the load state including a normal load state and an abnormal load state;

a first judgment module configured to determine, according to load states of the logical threads of the component, whether a number of logical threads of the component needs to be adjusted; and an adjustment module configured to adjust the number of logical threads of the component according to the result of determination result in response to determining that the number of logical threads of the component needs to be adjusted.

Clause 11. The apparatus of clause 10, wherein the adjustment module comprises:

an adjustment unit configured to adjust the number of the logical threads of the component to a number of current logical threads of the component*amount of data sent by a sending apparatus per second/amount of data received by the component per second, the sending apparatus being an apparatus that sends data to the component.

Clause 12. The apparatus of clause 10 or 11, wherein:

the abnormal load state includes a high load state and a low load state;

the utilization rate is equal to a space occupied by data stored in a message queue/a pre-allocated storage space of the message queue; and the first determination module comprises:

a first determination unit configured to determine whether a utilization rate of a data processing queue corresponding to a logical thread is greater than a first preset threshold;

a high load state determination unit configured to determine that the logical thread is in the high load state in response to determining that the utilization rate is greater than the first preset threshold;

a second determination unit configured to determine whether the utilization rate of the data processing queue corresponding to the logical thread is less than a second preset threshold in response to determining that the utilization rate is not greater than the first preset threshold; and a low load state determination unit configured to determine that the logical thread is in the low load state in response to determining that the utilization rate is less than the second preset threshold.

Clause 13. The apparatus of clause 12, wherein the first judgment module comprises:

a first counting unit configured to respectively count a number of logical threads in the high load state and a number of logical threads in the low load state among all the logical threads that are callable by the component;

a first calculation unit configured to calculate a high load probability and a low load probability of the component by using a high load probability calculation formula and a low load probability calculation formula respectively, the high load probability calculation formula=the number of logical threads in the high load state/the number of all the logical threads that are callable by the component, and the low load probability calculation formula=the number of logical threads in the low load state/the number of all the logical threads that are callable by the component;

a third determination unit configured to determine whether at least one of the high load probability and the low load probability of the component is greater than a third preset threshold; and a first determination unit configured to determine the number of logical threads of the component needs to be adjusted in response to determining that at least one of the high load probability and the low load probability of the component is greater than the third preset threshold.

Clause 14. The apparatus of any of clauses 10, 11 and 13, wherein the apparatus further comprises:

a second determination module configured to determine whether logical threads need to be added or deleted for the component according to the number of logical threads that the component needs to be adjusted and a number of current logical threads;

a second judgment module configured to determine whether logical threads are allowable to be added in an operational process associated with the current logical threads in response to determining that the logical threads need to be added;

an adding module configured to add the logical threads in the operational process associated with the current logical threads in response to determining that the logical threads are allowable to be added in the operational process associated with the current logical threads;

a third determination module configured to determine a number of operational processes that need to be added in response to determining that the logical threads are not allowable to be added in the operational process associated with the current logical threads; and a deletion module configured to delete logical threads in the operational process in response to determining that the corresponding logical threads need to be deleted.

Clause 15. The apparatus of clause 14, wherein the second judgment module comprises:

a second determination unit configured to determine a plurality of operational processes associated with the current logical threads;

a third determination unit configured to determine, according to a preset increase formula, a number of logical threads that is allowable to be added in each operational process, the increase formula being: the number of logical threads that is allowable to be added in the operational process=(total pre-allocated resources of the operational process/resources occupied by the operational process for running logical threads*a fourth preset value−1)*the number of logical threads running in the current operational process;

a second counting unit configured to count the total number of logical threads that is allowable to be added in all the associated operational processes;

a fourth judgment unit configured to determine whether the total number of logical threads that is allowable to be added is greater than or equal to the number of logical threads that need to be added for the component; and a third determination unit configured to determine that the logical threads are allowable to be added in the associated operational processes in response to determining that the total number of logical threads that is allowable to be added is greater than or equal to the number of logical threads that need to be added for the component.

Clause 16. The apparatus of clause 15, wherein the third determination unit comprises:

an acquisition subunit configured to acquire a number Q of logical threads that is allowable to run in the associated operational processes under a preset load threshold; and a calculation subunit configured to calculate, by using an operational process calculation formula, the number of operational processes that need to be added, the operational process calculation formula being a number of added operational processes=(N−T)/Q+1, wherein N is the number of logical threads that need to be added for the component, T is the number of logical threads that is allowable to be added in the associated operational processes, and T, N and Q are positive integers.

Clause 17. The apparatus of any of clauses 10, 11, 13, 15 and 16, wherein the apparatus further comprises:

a fourth determination module configured to determine, at intervals of a preset time, first logical threads that are callable by an upstream component of the component and second logical threads that are callable by a downstream component of the component; and an establishment module configured to establish a communication connection between third logical threads that are callable by the component and the first logical threads as well as a communication connection between the third logical threads and the second logical threads.

Clause 18. The apparatus of any of clauses 10, 11, 13, 15 and 16, wherein the apparatus further comprises:

a third determination module configured to determining sequentially whether a logical thread exits in an operational process associated with the component; and a deleting module configured to delete the operational process in response to determining that no logical thread exists in the operational process.

What is claimed is:

1. A method comprising:

acquiring a plurality of logical threads that are callable by a component;

determining a load state of a respective logical thread according to a utilization rate of a data processing queue corresponding to the respective logical thread, the load state being a normal load state or an abnormal load state;

determining, according to load states of the plurality of logical threads of the component, that a number of logical threads of the component needs to be adjusted by:

calculating a high load probability of the component and a low load probability of the component, determining that at least one of the high load probability of the component and the low load probability of the component is greater than a third preset threshold, and determining that the number of logical threads of the component needs to be adjusted; and adjusting the number of logical threads of the component.

2. The method of claim 1, wherein the adjusting the number of logical threads of the component comprises:

adjusting the number of logical threads of the component to be a number of current logical threads of the component*amount of data sent by a sending apparatus per second/amount of data received by the component per second, the sending apparatus being an apparatus that sends data to the component.

3. The method of claim 1, wherein:

the abnormal load state includes a high load state and a low load state.

4. The method of claim 3, wherein:

the utilization rate is a space occupied by data stored in a message queue divided by a pre-allocated storage space of the message queue.

5. The method of claim 4, wherein the determining the load state of the respective logical thread comprises:

determining that the utilization rate of the data processing queue corresponding to the respective logical thread is greater than a first preset threshold;

determining that the logical thread is in the high load state.

6. The method of claim 4, wherein the determining the load state of the respective logical thread comprises:

determining that the utilization rate of the data processing queue corresponding to the respective logical thread is less than a second preset threshold; and determining that the logical thread is in the low load state.

7. The method of claim 1, wherein determining, according to the load states of the plurality of logical threads of the component, that the number of logical threads of the component needs to be adjusted further comprises:

respectively counting a number of logical threads in the high load state and a number of logical threads in the low load state among the logical threads that are callable by the component.

8. The method of claim 1, wherein the calculating the high load probability of the component comprises:
   using a high load probability calculation formula=the number of logical threads in the high load state/a number of all the logical threads that are callable by the component.

9. The method of claim 1, wherein the calculating the low load probability of the component comprises:
   using a low load probability calculation formula=the number of logical threads in the low load state/a number of all the logical threads that are callable by the component.

10. The method of claim 1, further comprising:
    determining that the logical threads need to be deleted for the component according to the number of logical threads that needs to be adjusted for the component and a number of current logical threads; and
    deleting corresponding logical threads in the operational process.

11. The method of claim 1, wherein
    the logical threads run in one or more operational process; and
    the method further comprises:
       determining that the logical threads need to be added for the component according to the number of logical threads that needs to be adjusted for the component and a number of current logical threads;
       determining that the logical threads are allowable to be added in an operational process associated with the current logical threads; and
       adding the logical threads in the associated operational process.

12. The method of claim 11, wherein the determining that the logical threads are allowable to be added in the operational process associated with the current logical threads comprises:
    determining a plurality of operational processes associated with the current logical threads;
    determining a number of logical threads that is allowable to be added in a respective operational process,
    counting a total number of logical threads that is allowable to be added in the plurality of operational processes;
    determining that the total number of logical threads that is allowable to be added is greater than or equal to the number of logical threads that need to be added for the component; and
    determining that the logical threads are allowable to be added in associated operational processes.

13. The method of claim 12, wherein the determining the number of logical threads that is allowable to be added in a respective operational process comprises:
    using a preset increase formula, wherein a number of logical threads that is allowable to be added in the respective operational process=(total pre-allocated resources of the operational processes/resources occupied by the respective operational process for running logical threads*a fourth preset value−1)*a number of logical threads running in the respective operational process.

14. The method of claim 1, wherein:
    the logical threads run in one or more operational process; and
    the method further comprises:
       determining that the logical threads need to be added for the component according to the number of logical threads that needs to be adjusted for the component and a number of current logical threads;
       determining that the logical threads are not allowable to be added in an operational process associated with the current logical threads; and
       determining a number of operational processes that need to be added for the component.

15. The method of claim 14, wherein the determining the number of operational processes that need to be added comprises:
    acquiring a number Q of logical threads that is allowable to run in the associated operational process under a preset load threshold; and
    calculating, by using an operational process calculation formula, the number of operational processes that need to be added, the operational process calculation formula being a number of added operational processes= $(N-T)/Q+1$, wherein N is a number of logical threads that need to be added for the component, T is the number of logical threads that is allowable to be added in the associated operational process, and T, N and Q are positive integers.

16. The method of claim 1, further comprising:
    determining, at intervals of a preset time, a first logical thread that is callable by an upstream component of the component and a second logical thread that is callable by a downstream component of the component; and
    establishing a communication connection between a third logical thread that is callable by the component and the first logical thread and a communication connection between the third logical thread and the second logical thread.

17. The method of claim 1, further comprising:
    determining that a logical thread does not exist in an operational process associated with the component; and
    deleting the operational process.

18. An apparatus comprising:
    one or more processors; and
    one or more memories storing thereon computer-readable instructions that, when executed by the one or more processors, cause the one or more processors to perform acts comprising:
       acquiring a plurality of logical threads that are callable by a component;
       determining a load state of a respective logical thread according to a utilization rate of a data processing queue corresponding to the respective logical thread, the load state being a normal load state or an abnormal load state;
       determining, according to load states of the plurality of logical threads of the component, that a number of logical threads of the component needs to be adjusted by:
          calculating a high load probability of the component and a low load probability of the component,
          determining that at least one of the high load probability of the component and the low load probability of the component is greater than a third preset threshold, and
          determining that the number of logical threads of the component needs to be adjusted; and
       adjusting the number of logical threads of the component.

19. The apparatus of claim 18, wherein:
    the abnormal load state includes a high load state and a low load state.

20. One or more memories storing thereon computer-readable instructions that, when executed by the one or more processors, cause the one or more processors to perform acts comprising:
    acquiring a plurality of logical threads that are callable by a component;
    determining a load state of a respective logical thread according to a utilization rate of a data processing queue corresponding to the respective logical thread, the load state being a normal load state or an abnormal load state;
    determining, according to load states of the plurality of logical threads of the component, that a number of logical threads of the component needs to be adjusted by:
        calculating a high load probability of the component and a low load probability of the component,
        determining that at least one of the high load probability of the component and the low load probability of the component is greater than a third preset threshold, and
        determining that the number of logical threads of the component needs to be adjusted; and
    adjusting the number of logical threads of the component.

* * * * *